(12) United States Patent
Abbey et al.

(10) Patent No.: US 7,316,019 B2
(45) Date of Patent: Jan. 1, 2008

(54) GROUPING RESOURCE ALLOCATION COMMANDS IN A LOGICALLY-PARTITIONED SYSTEM

(75) Inventors: Christopher Patrick Abbey, Rochester, MN (US); Jonathan Ross Van Niewaal, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 964 days.

(21) Appl. No.: 10/422,190

(22) Filed: Apr. 24, 2003

(65) Prior Publication Data
US 2004/0215837 A1    Oct. 28, 2004

(51) Int. Cl.
*G06F 9/46* (2006.01)
(52) U.S. Cl. ..................... 718/104; 718/101
(58) Field of Classification Search ............... 718/104
See application file for complete search history.

(56) References Cited

U.S. PATENT DOCUMENTS 5,991,793 A * 11/1999 Mukaida et al. ............ 718/104

* cited by examiner

*Primary Examiner*—Meng-Al T. An
*Assistant Examiner*—Eric C Wai
(74) *Attorney, Agent, or Firm*—Owen J. Gamon

(57) ABSTRACT

A method, apparatus, system, and signal-bearing medium that in an embodiment determine a group associated with a command, wherein the command comprises a resource-allocating command in a logically-partitioned electronic device and determine when to perform the command based on the group. By grouping commands and scheduling the commands based on the group to which they belong, in an embodiment commands may be performed at an appropriate time when their impact on the performance of the logical partitions will be reduced.

1 Claim, 7 Drawing Sheets

| CHANGE COMMAND | REQUIRED STATE TO PROCESS | GROUP |
|---|---|---|
| CHANGE NUMBER OF PROCESSORS | NOT FAILED | IMMEDIATE INTERLOCKED |
| CHANGE NUMBER OF PROCESSORS TO THE MINIMUM | NOT FAILED | FUTURE |
| CHANGE NUMBER OF PROCESSORS TO THE MAXIMUM | POWERED OFF | FUTURE |
| CHANGE THE OWNER PARTITION OF AN I/O DEVICE | ALL STATES | IMMEDIATE NON-INTERLOCKED |

FIG. 3

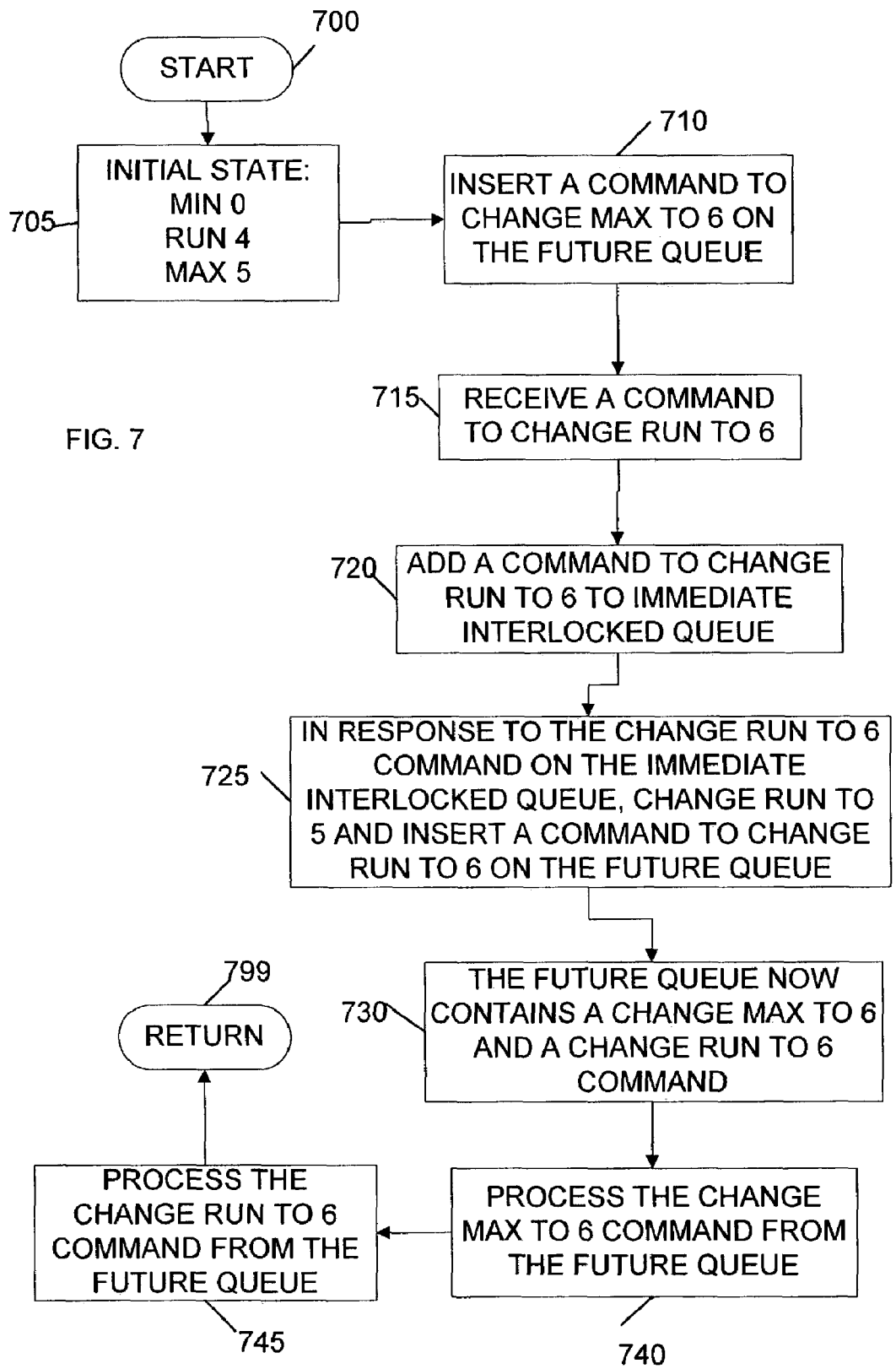

GROUPING RESOURCE ALLOCATION COMMANDS IN A LOGICALLY-PARTITIONED SYSTEM

LIMITED COPYRIGHT WAIVER

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever.

FIELD

An embodiment of the invention generally relates to computers. In particular, an embodiment of the invention generally relates to the management of multiple logical partitions in a logically-partitioned computer.

BACKGROUND

Computer technology continues to advance at a rapid pace, with significant developments being made in both software and in the underlying hardware upon which the software executes. One significant advance in computer technology is the development of multi-processor computers, where multiple computer processors are interfaced with one another to permit multiple operations to be performed concurrently, thus improving the overall performance of such computers. Also, a number of multi-processor computer designs rely on logical partitioning to allocate computer resources to further enhance the performance of multiple concurrent tasks.

With logical partitioning, a single physical computer is permitted to operate essentially like multiple and independent virtual computers (referred to as logical partitions), with the various resources in the physical computer (e.g., processors, memory, and input/output devices) allocated among the various logical partitions. Each logical partition may execute a separate operating system, and from the perspective of users and of the software applications executing on the logical partition, operates as a fully independent computer.

A resource shared among the logical partitions, often referred to as a hypervisor or a partition manager, manages the logical partitions and facilitates the allocation of resources to different logical partitions. A system administrator (a human user or a component in the computer) can dynamically move resources from one partition to another in order to manage the workload across the various partitions. The number of partitions and the number of resources can be large, so allocating and moving resources between partitions can result in a significant amount of processing overhead, which adversely impacts the performance of the partitions.

Without a better way of allocating and moving resources among logical partitions, the performance of logically-partitioned systems will continue to suffer.

SUMMARY

A method, apparatus, system, and signal-bearing medium are provided that in an embodiment determine a group associated with a command, wherein the command comprises a resource-allocating command in a logically-partitioned electronic device and determine when to perform the command based on the group. By grouping commands and scheduling the commands based on the group to which they belong, in an embodiment commands may be performed at an appropriate time when their impact on the performance of the logical partitions will be reduced.

BRIEF DESCRIPTION OF THE DRAWINGS

FIG. 3 depicts a block diagram of a change control data structure, according to an embodiment of the invention.

FIG. 7 depicts a flowchart of example processing for a partition manager when partially processing commands, depicting example data, according to an embodiment of the invention.

DETAILED DESCRIPTION

Figure 1:
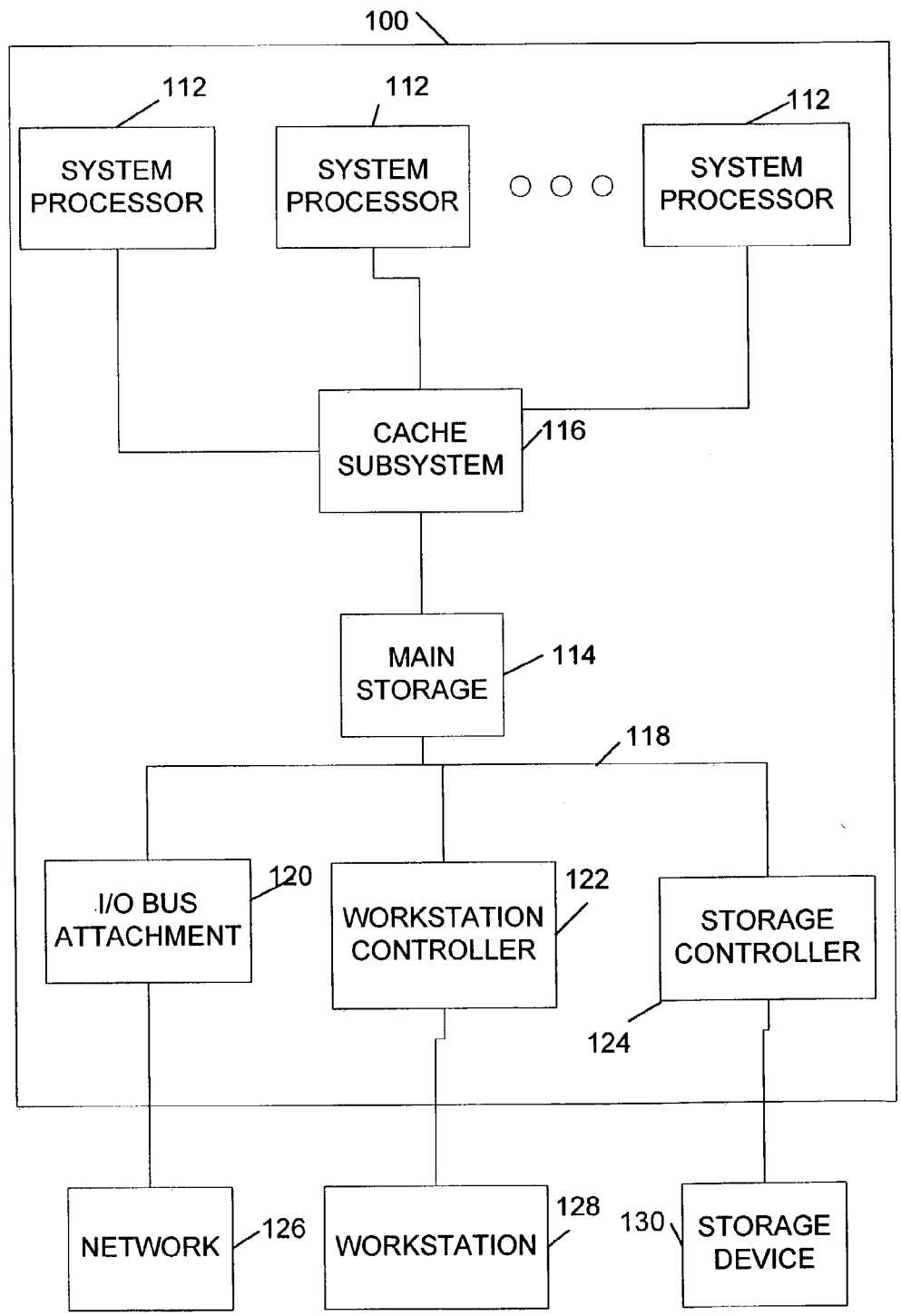
FIG. 1 depicts a block diagram of an example electronic device for implementing an embodiment of the invention.

Turning to the drawings, wherein like numbers denote like parts throughout the several views, FIG. 1 illustrates a data processing apparatus or electronic device 100 consistent with an embodiment of the invention. The electronic device 100 generically represents, for example, any of a number of multi-user computer systems such as a network server, a midrange computer, or a mainframe computer. But, embodiments of the invention may be implemented in other data processing apparatus, e.g., in stand-alone or single-user computer systems such as workstations, desktop computers, portable computers, pocket computers, tablet computers, or in other devices that have an embedded computing device, such as an embedded controller in a teleconferencing system, appliance, pager, telephone, automobile, PDA (Personal Digital Assistant), or any other appropriate device. One suitable implementation of an embodiment of the electronic device 100 is in a midrange computer such as the AS/400 series computer available from International Business Machines Corporation.

The electronic device 100 generally includes one or more system processors 112 coupled to a memory subsystem including main storage 114, e.g., an array of dynamic random access memory (DRAM), but in other embodiments any appropriate main storage may be used. Also illustrated as interposed between the processors 112 and the main storage 114 is a cache subsystem 116, typically including one or more levels of data, instruction and/or combination caches, with certain caches either serving individual processors or multiple processors. Furthermore, the main storage 114 is coupled to a number of types of external (I/O) devices via a system bus 118 and a plurality of interface devices, e.g., an input/output bus attachment interface 120, a workstation controller 122, and a storage controller 124, which respectively provide external access to one or more external networks 126, one or more workstations 128, and/or one or more storage devices 130.

The processors 112 represent central processing units of any type of architecture, such as a CISC (Complex Instruction Set Computing), RISC (Reduced Instruction Set Computing), VLIW (Very Long Instruction Word), or a hybrid architecture, although any appropriate processor may be used. In various embodiments, the processors 112 may be of all the same type or some or all may be of different types. The processors 112 execute instructions and typically include control units that organize data and program storage in memory and transfer data and other information between the various parts of the electronic device 100.

The system bus 118 may represent one or more busses, e.g., PCI (Peripheral Component Interconnect), ISA (Industry Standard Architecture), X-Bus, EISA (Extended Industry Standard Architecture), or any other appropriate bus and/or bridge (also called a bus controller).

The network 126 may be any suitable network or combination of networks and may support any appropriate protocol suitable for communication of data and/or code to/from the electronic device 100. In various embodiments, the network 126 may represent a storage device or a combination of storage devices, either connected directly or indirectly to the electronic device 100. In an embodiment, the network 126 may support Infiniband. In another embodiment, the network 126 may support wireless communications. In another embodiment, the network 126 may support hard-wired communications, such as a telephone line or cable. In another embodiment, the network 126 may support the Ethernet IEEE (Institute of Electrical and Electronics Engineers) 802.3x specification. In another embodiment, the network 126 may be the Internet and may support IP (Internet Protocol). In another embodiment, the network 126 may be a local area network (LAN) or a wide area network (WAN). In another embodiment, the network 126 may be a hotspot service provider network. In another embodiment, the network 126 may be an intranet. In another embodiment, the network 126 may be a GPRS (General Packet Radio Service) network. In another embodiment, the network 126 may be any appropriate cellular data network or cell-based radio network technology. In another embodiment, the network 126 may be an IEEE 802.11B wireless network. In still another embodiment, the network 126 may be any suitable network or combination of networks. Although one network 126 is shown, in other embodiments any number of networks (of the same or different types) may be present, including zero.

The storage device 130 represents one or more mechanisms for storing data. For example, the storage device 130 may include read only memory (ROM), random access memory (RAM), magnetic disk storage media, optical storage media, flash memory devices, and/or other machine-readable media. In other embodiments, any appropriate type of storage device may be used. Although only one storage device 130 is shown, multiple storage devices and multiple types of storage devices may be present. Although the storage device 130 is shown to be connected to the storage controller 124, in other embodiments, the storage device 130 may be accessed via the network 126. Although the storage device 130 is shown to be external to the electronic device 100, in another embodiment, the storage device 130 may be internal to the electronic device 100.

The hardware and software depicted in FIG. 1 may vary for specific applications and may include more or fewer elements than those depicted and may be arranged differently than depicted. For example, other peripheral devices such as audio adapters, or chip programming devices, such as EPROM (Erasable Programmable Read-Only Memory) programming devices may be used in addition to or in place of the hardware already depicted.

Figure 2:
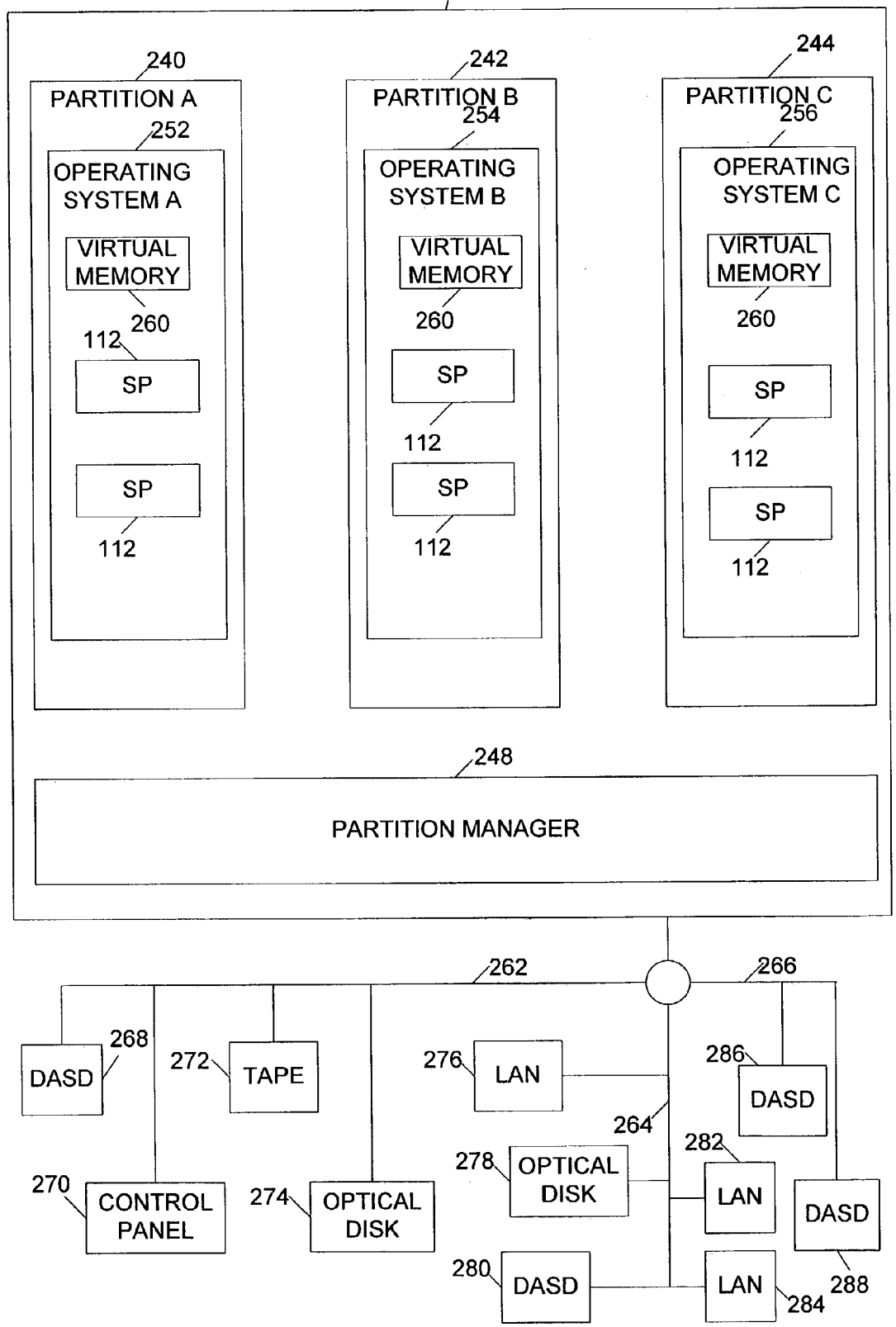
FIG. 2 depicts a block diagram of the primary hardware and software components and resources in and/or associated with the electronic device of FIG. 1, according to an embodiment of the invention.

FIG. 2 illustrates in greater detail the primary software and hardware components and resources utilized in implementing a logically-partitioned computing environment on the electronic device 100, including a plurality of logical partitions 240, 242, and 244 managed by a partition manager 248, according to an embodiment of the invention. All or only a portion of the logical partitions 240, 242, and 244 and the partition manager 248 may at various times exist in the main storage 114, the cache subsystem 116, and/or the storage device 130 and in various embodiments may be transmitted and/or received across the network 126, as previously shown in FIG. 1.

Each logical partition 240, 242, and 244 utilizes an operating system (e.g., operating systems 252, 254 and 256 for the logical partitions 240, 242 and 244, respectively), that controls the primary operations of the logical partition in much the same manner as the operating system of a non-partitioned computer. For example, each operating system 252, 254, and 256 may be implemented using the OS/400 operating system available from International Business Machines Corporation, residing on top of a kernel, e.g., AS/400 system licensed internal code (SLIC).

Each logical partition 240, 242, and 244 executes in a separate, or independent, memory space, represented by virtual memory 260. Moreover, each logical partition 240, 242, and 244 is statically and/or dynamically allocated a portion of the available resources in the electronic device 100. For example, each logical partition is allocated one or more processors 112, as well as a portion of the available memory space for use in the virtual memory 260. In an embodiment, the logical partitions 240, 242, and 244 may share specific hardware resources such as processors, such that a given processor is utilized by more than one logical partition. In another embodiment, the hardware resources can be allocated to only one logical partition at a time. Although three logical partitions 240, 242, and 244 are shown in FIG. 2, other embodiments may support any number of logical partitions.

The partition manager 248 includes instructions capable of being executed on the processors 112 or statements capable of being interpreted by instructions executed on the processors 112 to carry out the functions as further described below with reference to FIGS. 4, 5, 6, and 7. The partition manager 248 manages the partitions 240, 242, and 244, allocates resources between the partitions, and responds to requests from a system administrator to move resources between the partitions.

Additional resources, e.g., mass storage, backup storage, user input, network connections, and the like, are typically allocated to one or more logical partitions by the partition manager 248. Resources can be allocated in a number of manners, e.g., on a bus-by-bus basis, or on a resource-by-resource basis, with multiple logical partitions sharing resources on the same bus. Some resources may even be allocated to multiple logical partitions at a time.

FIG. 2 illustrates, for example, three logical buses 262, 264 and 266, with a plurality of resources on bus 262, including a direct access storage device (DASD) 268, a control panel 270, a tape drive 272, and an optical disk drive 274, allocated to the logical partition 240. Bus 264, on the other hand, may have resources allocated on a resource-by-resource basis, e.g., with local area network (LAN) adaptor 276, optical disk drive 278, and DASD 280 allocated to the logical partition 242, and LAN adaptors 282 and 284 allocated to the logical partition 244. The bus 266 may represent, for example, a bus allocated specifically to the logical partition 244, such that all resources on the bus, e.g., the DASD's 286 and 288, are allocated to the same logical partition.

The illustration of specific resources in FIG. 2 is merely exemplary in nature, and any combination and arrangement of resources may be allocated to any logical partition in the alternative. Moreover, resources may be reallocated on a dynamic basis to service the needs of other logical partitions. Furthermore, resources may also be represented in terms of input/output processors (IOP's) used to interface the electronic device 100 with the specific hardware devices. The resources shown in FIG. 2 are only exemplary, and any appropriate type of resources may be present in other embodiments of the invention.

The various software components and resources illustrated in FIG. 2 and implementing the embodiments of the invention may be implemented in a number of manners, including using various computer software applications, routines, components, programs, objects, modules, data structures, etc., referred to hereinafter as "computer programs," or simply "programs." The computer programs typically comprise one or more instructions that are resident at various times in various memory and storage devices in the electronic device 100, and that, when read and executed by one or more processors in the electronic device 100, cause that electronic device to perform the steps necessary to execute steps or elements embodying the various aspects of an embodiment of the invention. Moreover, while embodiments of the invention have and hereinafter will be described in the context of fully functioning electronic devices, the various embodiments of the invention are capable of being distributed as a program product in a variety of forms, and that the invention applies equally regardless of the particular type of signal-bearing medium used to actually carry out the distribution. Examples of signal-bearing media include but are not limited to recordable type media such as volatile and non-volatile memory devices, floppy and other removable disks, hard disk drives, magnetic tape, optical disks (e.g., CD-ROM's, DVD's, etc.), among others, and transmission-type media such as digital and analog communication links, including wireless communication links.

In addition, various programs described hereinafter may be identified based upon the application for which they are implemented in a specific embodiment of the invention. But, any particular program nomenclature that follows is used merely for convenience, and thus embodiments of the invention should not be limited to use solely in any specific application identified and/or implied by such nomenclature.

The exemplary environments illustrated in FIGS. 1 and 2 are not intended to limit the present invention. Indeed, other alternative hardware and/or software environments may be used without departing from the scope of the invention.

FIG. 3 depicts a block diagram of a change control data structure 300, which is used by the partition manager 248 to allocate and move resources among the partitions, according to an embodiment of the invention. The change control data structure 300 includes a change command field 305, a required state to process field 310 and a group field 315. When the partition manager 248 receives a change command, the partition manager finds the change command in the change command field 305 and uses the corresponding entry in the required state field 310 and the group field 315 to process the change.

The change command field 305 includes an identification of a command directed to a partition to change the partition's allocation of resources. For example, a system administrator may request that a partition change its number of allocated processors to a new number (the contents of the change command field 305 in the entry 320), may request that a partition change its number of allocated processors to a minimum number (the contents of the change command field 305 in the entry 325), may request that a partition change its number of allocated processors to a maximum number (the contents of the change command field 305 in the entry 330), and may request that ownership of an I/O (input/output) device be transferred from one partition to another partition (the contents of the change field 305 in the entry 335).

The required state field 310 includes the state that the affected partition is required to be in for the partition manager 248 to process the command indicated in the corresponding entry in the change command field 305. In the example shown, the entry 320 includes "not failed" in the required state field 310, the entry 325 includes "not failed" in the required state field 310, the entry 330 includes "powered off" in the required state field 310, and the entry 335 includes "all states" in the required state field 310. A value of "not failed" indicates that the command indicated in the change command field 305 may be performed so long as the partition to which the command is directed is not in a failure state. A value of "all states" indicates that the command indicated in the change command field 305 may be performed regardless of the state of the partition to which the command is directed. Examples of other possible states of the partition include powered on, powering on, powering off, and failed, although in other embodiments any appropriate state of the partition may be used.

The group field 315 includes a value indicating the group to which the associated command indicated in the change command field 305 belongs. In an embodiment, the value in the group field 35 specifies the time that it is appropriate for the partition manager 248 to perform the change requested by the value in the corresponding entry in the change command field 305. But, in other embodiments a group may specify any criteria for processing the associated change command. In the example shown, the entry 320 includes "immediate interlocked" in the group field 315, the entry 325 includes "future" in the group field 315, the entry 330 includes "future" in the group field 315, and the entry 335 includes "immediate non-interlocked" in the group field 315. A value of "immediate interlocked" indicates that the change indicate in the corresponding entry in the field 305 may be performed immediately in an interlocked manner, as further described below with reference to FIGS. 4 and 5. A value of "future" indicates that the change indicated in the corresponding command in the change command field 305 must wait until the future to be performed, as further described below with reference to FIGS. 4 and 6. A value of "immediate non-interlocked" indicates that the change indicated in the corresponding entry in the change command field 305 may be performed immediately in an non-interlocked manner, as further described below with reference to FIG. 4.

Although the change control data structure 300 is drawn to include three fields 305, 310, and 315, in other embodiments, the change control data structure 300 may include more or fewer fields. Although the change control data structure 300 is drawn to include four entries 320, 325, 330, and 335, in other embodiments, the change control data structure 300 may include more or fewer entries. The data shown in the change control data structure 300 is exemplary only, and any appropriate data may be present. In another embodiment, the change control data structure 300 is not used, and instead the information regarding change commands and their associated required states and groups is embedded in the logic of the partition manager 248.

Figure 4:
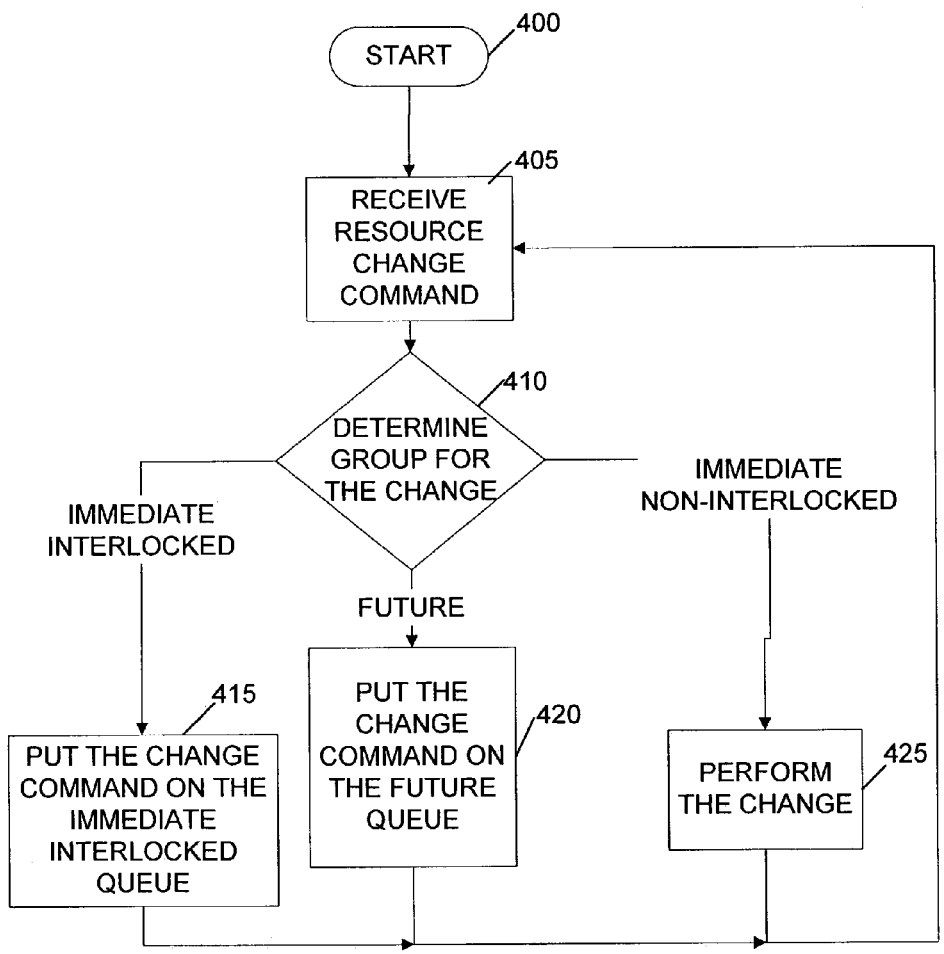
FIG. 4 depicts a flowchart of example processing for a partition manager when processing a resource change command, according to an embodiment of the invention.

FIG. 4 depicts a flowchart of example processing for the partition manager 248 when processing a resource change command, according to an embodiment of the invention. Control begins at block 400. Control then continues to block 405 where the partition manger 248 receives a resource change command from the system administrator or from internally within the partition manager 248. Control then continues to block 410 where the partition manager 248 determines the type of the change command, i.e., the partition manager 248 determines the group to which the change command belongs. In an embodiment, the partition manager 248 determines the group by finding an entry for the requested change using the change command field 305 in the change control table 300, and then finding the associated value in the group field 315 for the entry. In other embodiments, the information shown in the change control table 300 may be embedded in the logic of the partition manager 248, so the change control table 300 is not used.

If the partition manager 248 at block 410 determines that the group of the change command is immediate interlocked, then control continues to block 415 where the partition manager 248 inserts the change command on the immediate-interlocked queue. Processing of the immediate-interlocked queue is further described below with reference to FIG. 5. Control then returns to block 405 as previously described above.

If the partition manager 248 at block 410 determines that the group of the change command is future, then control continues to block 420 where the partition manager 248 inserts the change command on the future queue. Processing of the future queue is further described below with reference to FIG. 6. Control then returns to block 405 as previously described above.

If the partition manager 248 at block 410 determines that the group of change is non-immediate interlocked, then control continues to block 425 where the partition manager 248 performs the change indicated in the change command. Control then returns to block 405 as previously described above.

Figure 5:
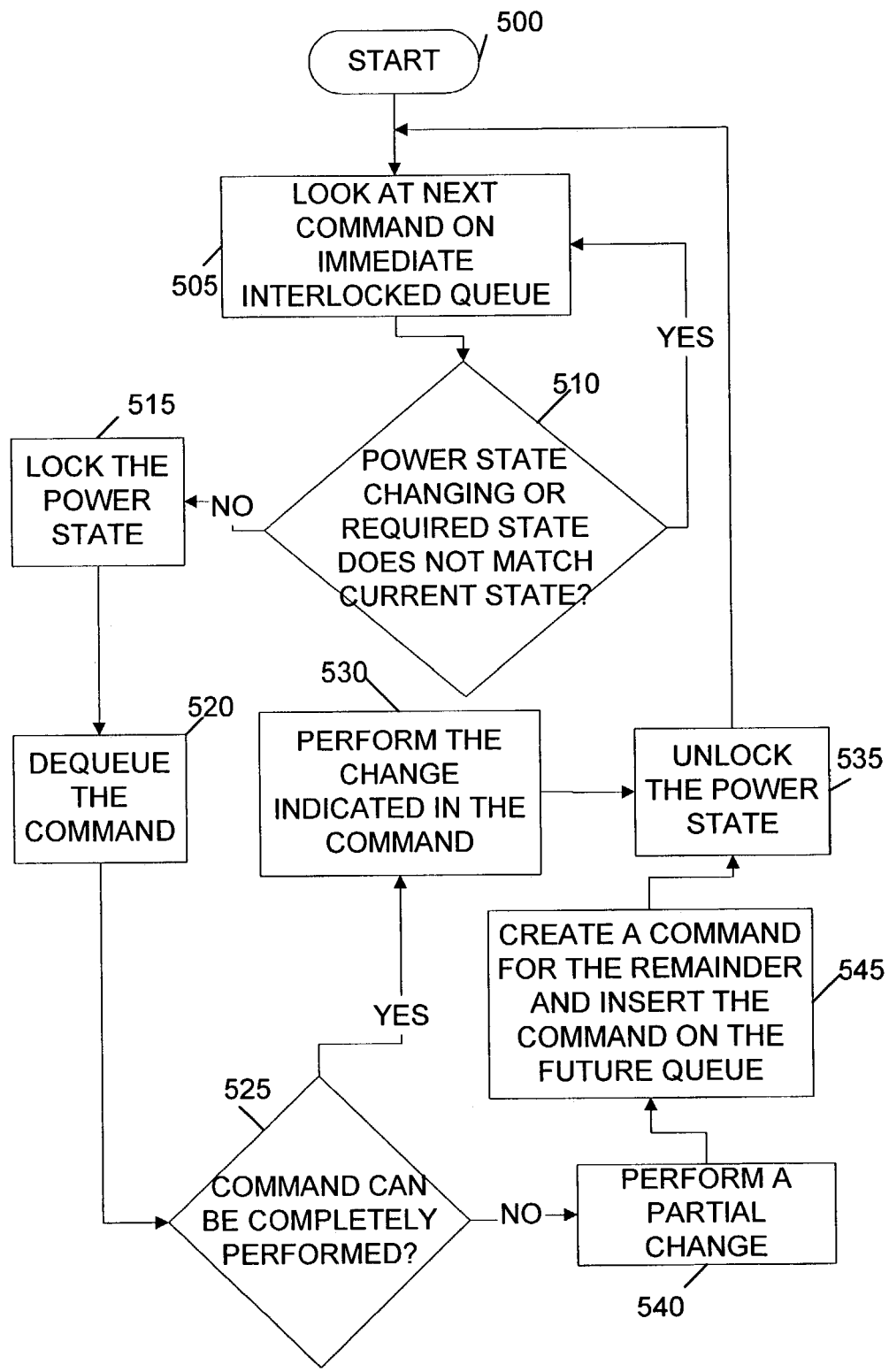
FIG. 5 depicts a flowchart of example processing for a partition manager when processing an immediate-interlocked command queue, according to an embodiment of the invention.

The groups and their associated processing shown in FIG. 5 are exemplary only, and any number of groups and any type of associated processing may be present in other embodiments.

FIG. 5 depicts a flowchart of example processing for the partition manager 248 when processing an immediate-interlocked command queue, according to an embodiment of the invention. Control begins at block 500. Control then continues to block 505 where the partition manager 248 examines the next command on the immediate-interlocked command queue. Control then continues to block 510 where the partition manager 248 determines whether the current state in the partition to which the next command is directed is powering on or powering off or the required state 310 does not match the current state of the partition.

If the determination at block 510 is true, then the next command cannot currently be performed, so control returns to block 505, as previously described above.

If the determination at block 510 is false, then the next command can be performed, so control continues to block 515 where the partition manager 248 locks the power state of the partition to which the next command is directed, which prevents the power state from changing. Control then continues to block 520 where the partition manager 248 de-queues the next command from the immediate-interlocked command queue. Control then continues to block 525 where the partition manager 248 determines whether the command can be completely performed. The determination may be made, for example, based on the state of the resources allocated to the partition. If the determination at block 525 is true, then control continues to block 530 where the partition manager 248 performs the change specified by the de-queued command. Control then continues to block 535 where the partition manager 248 unlocks the power state of the partition to which the next command was directed. Control then returns to block 505, as previously described above.

If the determination at block 525 is false, then control continues to block 540 where the partition manager 248 partially performs the command. Control then continues to block 545 where the partition manager 248 creates a command for the remainder that could not immediately be performed and inserts the command directed to the remainder on the future queue. An example of partially performing a command and inserting a command for the remainder on the future queue is further described below with reference to FIG. 7. Control then continues to block 535, as previously described above.

Figure 6:
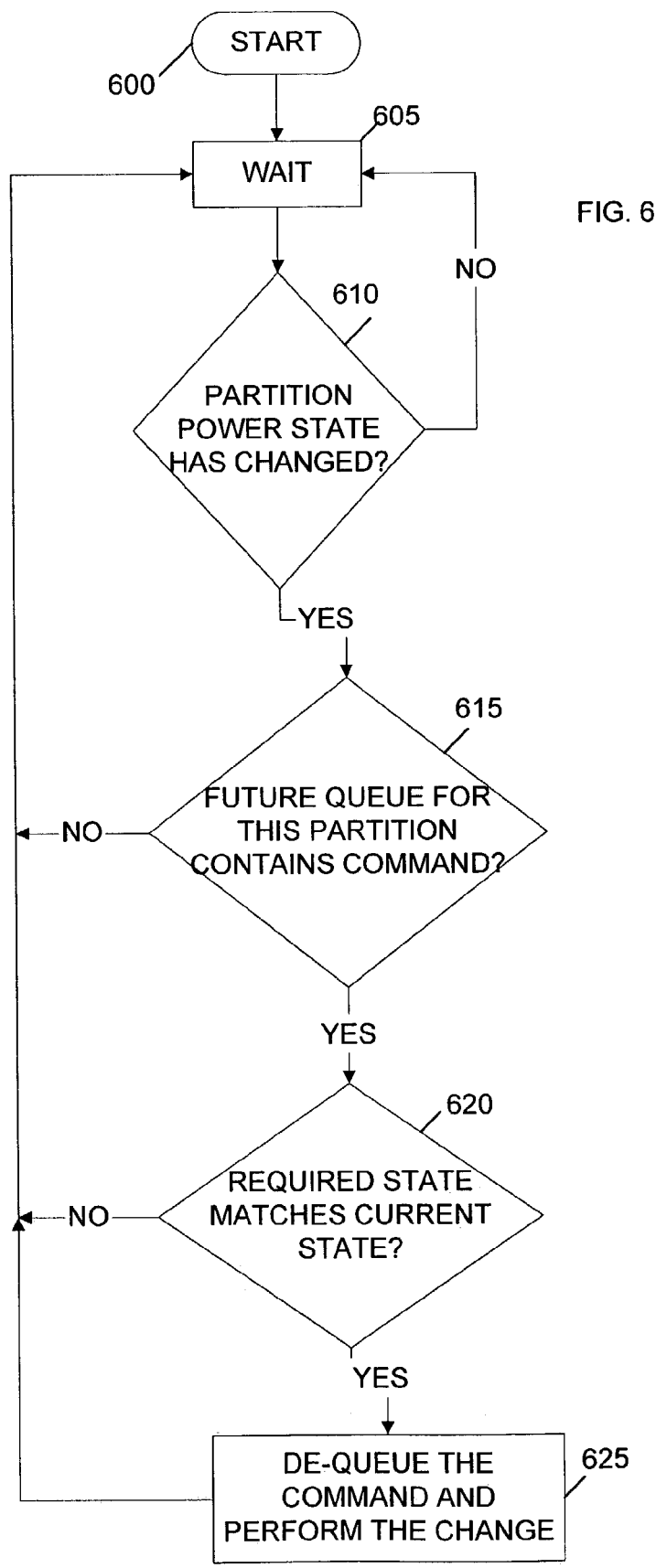
FIG. 6 depicts a flowchart of example processing for a partition manager when processing a future command queue, according to an embodiment of the invention.

FIG. 6 depicts a flowchart of example processing for the partition manager 248 when processing a future command queue, according to an embodiment of the invention. Control begins at block 600. Control then continues to block 605 where the partition manger 248 waits for an amount of time. Control then continues to block 610 where the partition manager 248 determines whether the power state has changed or undergone a transition from one state to another. Examples of changes in partition power state changes are from powered off to powering on, from powering on to powered on, from powered on to powering off, from powering off to powered off, or from any state to a failure state. In another embodiments, any other appropriate state transitions may be used. If the determination at block 610 is false, then control returns to block 605, as previously described above.

If the determination at block 610 is true, then control continues to block 615 where the partition manager 248 determines whether the future queue associated with the current partition contains a command. If the determination at block 615 is true, then control continues to block 620 where the partition manager 248 determines whether the state in the required state field 310 associated with the command on the future queue matches the current state of the partition. If the determination at block 620 is false, then control returns to block 605, as previously described above.

If the determination at block 620 is true, then control continues to block 625 where the partition manager 248 removes the command from the future queue and performs the change specified in the command. Control then returns to block 605 as previously described above.

If the determination at block 615 is false, then control returns to block 605, as previously described above.

FIG. 7 depicts a flowchart of example processing for partially processing commands, depicting example data, according to an embodiment of the invention. Control begins at block 700. Control then continues to block 705 where the initial state of the partition is as follows: the partition's minimum number of processors that can be allocated is zero, the current running number of processors allocated to the partition is four, and the maximum number of processors that can be allocated to the partition is five. Control then continues to block 710 where the system administrator sends a command to the partition manager 248 to change the maximum number of processors for the partition to six. The partition manager 248 inserts the command onto the future queue. Control then continues to block 715 where the partition manager 248 receives a command to change the current number of running processors for the partition to six. Control then continues to block 720 where the partition manager 248 adds the command received at block 715 to the immediate-interlocked queue.

Control then continues to block 725 where the partition manager 248 de-queues the command to change the number of running processors to six from the immediate-interlocked queue. (The processing for the immediate-interlocked queue was previously described above with reference to FIG. 5.) But, the partition manager 248 cannot change the number of running processors to six because the maximum number of processors allowable for the partition is still five. So, the partition manager 248 partially completes the command by changing the number of running processors for the partition from four to five. The partition manager 248 then inserts a remainder command to change the number of running processors to six on the future queue in order to accomplish the remainder of the original command.

Control then continues to block 730 where the future queue now contains a command to change the maximum number of processors for the partition to six (previously inserted at block 710) and a command to change the number of running processors for the partition to six (previously inserted at block 725).

Control then continues to block 740 where the partition manager 248 de-queues the change maximum command from the future queue and changes the maximum number of processors possible to allocate to the partition to six. Control then continues to block 745 where the partition manager 248 de-queues the command to change the number of currently running processors to six from the future queue and performs the change. The processing for the future queue was previously described above with reference to FIG. 6. Control then continues to block 799 where the logic sequence returns.

The data illustrated in FIG. 7 is exemplary only, and in other embodiments any appropriate data may be used.

In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. Different instances of the word "embodiment" as used within this specification do not necessarily refer to the same embodiment, but they may. The previous detailed description is, therefore, not to be taken in a limiting sense, and the scope of the present invention is defined only by the appended claims.

In the previous description, numerous specific details were set forth to provide a thorough understanding of the invention. But, the invention may be practiced without these specific details. In other instances, well-known circuits, structures, and techniques have not been shown in detail in order not to obscure the invention.

What is claimed is:

1. A method comprising:
   determining a group associated with a type of a command, wherein the command comprises a resource-allocating command in a logically-partitioned electronic device, wherein the group comprises an immediate interlocked group;
   determining when to perform the command based a required state associated with the group and based on a power state of a partition in the logically-partitioned electronic device; and
   performing the command when the required state matches the power state of the partition in the logically-partitioned electronic device, wherein the performing the command changes allocation of a resource to the partition.

* * * * *